US008484138B2

(12) United States Patent
Cahill-O'Brien et al.

(10) Patent No.: US 8,484,138 B2
(45) Date of Patent: Jul. 9, 2013

(54) COMBINED CATHODIC PROTECTION AND METER READING MONITORING SYSTEM (75) Inventors: Barry Cahill-O'Brien, Spokane, WA (US); Mark K. Cornwall, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 12/890,786

(22) Filed: Sep. 27, 2010

(65) Prior Publication Data
US 2011/0078063 A1 Mar. 31, 2011

Related U.S. Application Data (60) Provisional application No. 61/246,570, filed on Sep. 29, 2009.

(51) Int. Cl.
*G01R 11/56* (2006.01)
*G06Q 50/06* (2012.01)

(52) U.S. Cl.
CPC ..................................... *G06Q 50/06* (2013.01)
USPC ..................... 705/412; 340/870.01

(58) Field of Classification Search
None
See application file for complete search history.

(56) References Cited

U.S. PATENT DOCUMENTS

| | | | |
|---|---|---|---|
| 3,815,126 A | 6/1974 | Batz | |
| 4,238,825 A | 12/1980 | Geery | |
| 5,801,643 A | 9/1998 | Williams et al. | |
| 6,088,659 A * | 7/2000 | Kelley et al. | 702/62 |
| 6,366,217 B1 * | 4/2002 | Cunningham et al. | 340/870.31 |
| 7,027,957 B2 | 4/2006 | Fourie et al. | |
| 7,058,523 B2 | 6/2006 | Ramirez | |
| 7,068,052 B2 | 6/2006 | Hilleary et al. | |
| 7,069,161 B2 | 6/2006 | Gristina et al. | |
| 7,298,288 B2 | 11/2007 | Nagy et al. | |
| 7,337,078 B2 | 2/2008 | Bond et al. | |
| 7,661,306 B2 | 2/2010 | Crottie | |
| 8,054,199 B2 | 11/2011 | Addy | |
| 2001/0010032 A1 | 7/2001 | Ehlers et al. | |
| 2002/0030604 A1 | 3/2002 | Chance et al. | |
| 2002/0039069 A1 | 4/2002 | Chance et al. | |
| 2006/0031180 A1 | 2/2006 | Tamarkin et al. | |
| 2008/0177678 A1 | 7/2008 | Di Martini et al. | |
| 2008/0180275 A1 | 7/2008 | Whitaker et al. | |
| 2008/0219210 A1 | 9/2008 | Shuey et al. | |
| 2009/0111520 A1 | 4/2009 | Ring | |
| 2010/0036939 A1 * | 2/2010 | Yang et al. | 709/224 |

OTHER PUBLICATIONS

David J. Southern P.E., Product Development Manager, FreeWave Technologies, Inc., "Operators Extend SCADA Investment to Vital Cathodic Protection", pp. 16-17 of *Remote Site & Equipment Management Magazine*, Jun./Jul. 2008.

(Continued)

*Primary Examiner* — Faris Almatrahi
(74) *Attorney, Agent, or Firm* — Dority & Manning, P.A.

(57) ABSTRACT

Disclosed are apparatus and related methodologies for increasing functionality of gas metrology devices used in a supervisory Control and Data Acquisition (SCADA) network by combining the collection of meter data with cathodic protection (CP) monitoring data in a single system. Per present subject matter, CP monitoring data may be collected at individual metrology locations and combined with data otherwise bubbled up to SCADA data collectors for transmission to the network head end. CP data collection and transmission with the bubbled up metrology data provides a significant increase in the amount of CP data collected and offers the advantage of relatively earlier detection of CP installation related problems in addition to significant reduction in data collection costs.

20 Claims, 2 Drawing Sheets

OTHER PUBLICATIONS

PCT International Search Report for PCT International Application No. PCT/US2010/049820 dated Nov. 15, 2010.

PCT Written Opinion of the International Searching Authority for PCT International Application No. PCT/US2010/049820 dated Nov. 15, 2010.

PCT International Search Report for PCT International Application No. PCT/US2010/050340 dated Nov. 26, 2010.

PCT Written Opinion of the International Searching Authority for PCT International Application No. PCT/US2010/050340 dated Nov. 26, 2010.

Notice of Acceptance dated Mar. 5, 2013 for Australian Patent Application No. 2010298382.

U.S. Appl. No. 12/889,610 Office Action issued Dec. 26, 2012.

U.S. Appl. No. 12/887,856 Office Action dated Jan. 7, 2013.

* cited by examiner

COMBINED CATHODIC PROTECTION AND METER READING MONITORING SYSTEM

PRIORITY CLAIM

This application claims the benefit of previously filed U.S. Provisional Patent Application entitled "COMBINED CATHODIC PROTECTION AND METER READING MONITORING SYSTEM," assigned USSN 61/246,570, filed Sep. 29, 2009, and which is incorporated herein by reference for all purposes.

FIELD OF THE INVENTION

The present subject matter relates to cathodic protection monitoring. More specifically, the present subject matter relates to methodologies for advantageously combining the collection of meter data with cathodic protection monitoring data in a single system.

BACKGROUND OF THE INVENTION

For gas utilities, there are several system integrity activities that are labor intensive and expensive to perform. Cathodic protection is an industry standard method to prevent buried iron or steel structures (pipes, foundations, etc.) from corrosion. When properly protected, the ferrous metal ceases to corrode, and will last indefinitely. Cathodic protection involves placing a slight negative potential (for example, −0.8 to −1.2 VDC), to the protected metal, with respect to the surrounding ground. Generally speaking, cathodic protection can be either passive, employing sacrificial buried anodes, or active, using transformers and rectifiers. Further general information relating to cathodic protection is readily available and thus will not be further discussed herein as it forms no particular aspect of the present subject matter.

The gas industry uses cathodic protection extensively to protect buried iron/steel pipes from corrosion. Due to the inherent safety issues related to the distribution of flammable gas, under present regulatory conditions, the Department of Transportation (DOT) requires gas utilities to inspect the condition of their cathodic protection system and report on it at least on an annual basis. A utility maintenance department is also generally concerned with cathodic protection as it prevents the long term deterioration of the pipes.

Cathodic protection systems can become compromised when the potential between the surrounding earth and the protected structure becomes too small. Such event can occur with the failure of the anodes, or transformers/rectifiers, which provide the potential, as well as failure of ground beds associated with the generation of the protecting potential. In addition, the protection can be compromised when the insulation between the pipe and grounded structures fails. Such can be a physical insulator failure, or can be when a grounded structure touches the protected structure, for example, in an instance where a water pipe crosses a protected gas pipe, or a metal dog leash, etc. is attached to a protected pipe, and becomes grounded.

Once the cathodic protection is compromised, the protected structure begins to deteriorate as rust begins to pit the structure. Such deterioration is irreversible, and can eventually lead to failure of the structure (resulting in, for example, a gas leak). Prompt recognition and attention to problems related to a compromised cathodic protection system can save expensive repairs from being required, and can help identify the cause of the failure, before vegetation, construction, or other intervening events covers up the source.

Utility companies for regulatory compliance must periodically measure the potential between the surrounding ground and the protected structure. For example, a voltmeter can be used to measure such potential, which must exist within the range of −0.8 VDC and −1.2 VDC in order to provide most complete protection. During pipe burial, test stations are installed to provide access to the potential of the protected structure, and a portable or permanent ground reference provides the potential of the surrounding ground. As well understood by those of ordinary skill in the art, the associated volt meter or similar device is placed between such two potentials in order to determine the difference.

Test stations may typically be situated in locations where there is little access to power. Such fact typically prevents the use of a line powered monitoring system. A battery based monitoring system would have limited life, and require some maintenance. Due to the cost of developing a suitable battery based system, the industry essentially has had to utilize an expensive manual process.

U.S. Patent Application Publication 2008/0177678 A1 to DiMartini et al. discloses a method described as communicating between a utility and its customer locations. U.S. Patent Application Publication 2006/0031180 A1 to Tamarkin et al. describes integrated metrology systems and information and control apparatus for interaction with integrated metrology systems. U.S. Pat. No. 7,069,161 B2 to Gristina et al. discloses a system described as managing resource infrastructure and resource consumption in real time. The complete disclosures of all United States Published Patent Applications and Patents mentioned herein are fully incorporated herein by reference for all purposes. An article by David J. Southern "Operators Extend SCADA Investment to Vital Cathodic Protection" in the June/July 2008 issue of *Remote Site & Equipment Management* describes the possible integration of a frequency hopping spread spectrum cathodic protection remote monitoring device into an existing Supervisory Control and Data Acquisition (SCADA) infrastructure.

While various implementations of telemetry systems have been developed, and while various integrated metrology systems have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, improved apparatus and methodology for carrying out cathodic protection monitoring and testing over an Advanced Metering Infrastructure (AMI) have been provided.

In an exemplary configuration, cathodic protection monitoring and testing data are carried over AMI networks by way of nodes and endpoints requiring very low power consumption.

In one of their simpler forms, battery powered endpoints are provided that eliminate the need for AC power at telemetry sites.

Another positive aspect of the present type of apparatus and methodology is that it significantly reduces the cost of monitoring and testing cathodic protection systems.

In accordance with aspects of certain embodiments of the present subject matter, methodologies are provided to relatively quickly identify faults and alarms and report such through the data collecting AMR/AMI system.

In accordance with certain aspects of other embodiments of the present subject matter, methodologies have been developed to concurrently collect meter read utility consumption data and cathodic protection related data in a cost effective manner.

In accordance with further aspects of still further embodiments of the present subject matter, alarm mechanisms and two-way communications capabilities are provided in an AMR system that provides greater insight into the general health of a gas distribution system.

In accordance with yet still further aspects of the present subject matter, cathodic protection information collection may be incorporated into a meter reading endpoint device to permit collection of cathodic protection information as a part of the meter reading endpoint functionality.

In accordance with yet further aspects of the present subject matter, the number of cathodic protection monitoring points may be significantly increased relatively inexpensively.

One exemplary embodiment of the present subject matter relates to a telemetry system for transmitting data related to cathodic protection operational conditions and utility usage between user locations and a centralized data collection facility. Such a system preferably comprises a plurality of utility metrology means and associated endpoint devices, situated at respective locations of utility consumption, for transmitting utility consumption data associated with a respective location; at least one cathodic protection telemetry device respectively associated with at least one of such locations having an associated cathodic protection system device, for monitoring predetermined cathodic protection operational conditions at such telemetry device location and providing data related thereto to an endpoint device associated with such location for transmission by such endpoint device; a main communications network; at least one collector, for communications with such endpoint devices and such main communications network; and a head end processor for communications with such main communications network. With such arrangement, advantageously such utility consumption data and cathodic protection operational conditions data are collected and communicated to such head end processor via such main communications network.

In certain variations of the foregoing embodiments, such utility consumption may comprise gas consumption; and such system may further include a plurality of telemetry devices respectively associated with selected of such endpoint devices, for respectively monitoring for a plurality of preselected operational conditions at such endpoint device location and transmitting data related thereto. In other options for such variations, such telemetry devices may respectively include alarm means for forwarding alarm signaling whenever monitored conditions thereat fall outside set parameters.

In other present alternative embodiments of the foregoing exemplary telemetry systems, such utility consumption may comprise gas consumption; and such system may further include a plurality of cathodic protection telemetry devices respectively associated with a plurality of utility consumption locations, each of such telemetry devices monitoring for a preselected condition including at least one of localized associated pipeline-to-reference voltage measurements and localized impress current for an associated pipeline. Per other present alternatives thereto, each of such telemetry devices may respectively include analog to digital converter means for providing cathodic protection operational condition data to either of such metrology means and such endpoint devices, so that cathodic protection operational condition data is transmitted one of directly and indirectly to such head end processor via an endpoint device.

Yet in other present alternatives, an exemplary such telemetry device may include analog to digital converter means coupled with a localized section of an associated pipeline and an associated localized reference, for outputting digital data of pipeline-to-reference voltage measurements; and may include battery-operated power supply means for powering such metrology means and such devices.

Per other present variations, such head end processor may further include data management functionality, for storing and processing gas usage data; and such main communications network may comprise one of a WAN, a wireless network, and the internet. Further alternatively, such communications may comprise wireless bidirectional communications; and such system may further include battery-operated power supply means for such metrology means and such devices.

In accordance with yet another exemplary embodiment in accordance with the present subject matter, a bidirectional gas AMI/SCADA network is provided for transmitting data related to cathodic protection operational conditions and gas usage between user locations and a centralized data collection facility. Such a network preferably comprises a plurality of combined gas metrology/endpoint devices for obtaining and transmitting gas usage data associated with its respective location; a plurality of cathodic protection monitoring devices, respectively associated with selected of such metrology/endpoint device locations, for monitoring at least one preselected condition related to cathodic protection status at such selected location, and providing cathodic protection status data to the associated metrology/endpoint device for transmittal therefrom; a WAN; a plurality of data collection devices, for bidirectional communications with selected of such metrology/endpoint devices and such WAN; and a centralized data collection facility in bidirectional communication with such WAN, for receiving and processing gas usage data and cathodic protection status data.

In alternative exemplary present such networks, such preselected condition may include at least one of localized associated pipeline-to-reference voltage measurements and localized impress current for an associated pipeline. In other present alternatives, such cathodic protection monitoring devices may include analog to digital converter means for receiving signals from associated localized cathodic protection status and for outputting in digital form such cathodic protection status data to an associated metrology/endpoint device; and such network may further include battery-operated power supply means associated with such devices.

In other present alternative network embodiments, such alternative networks may further include a plurality of telemetry devices respectively associated with selected of such metrology/endpoint devices, for respectively monitoring for a plurality of preselected operational conditions at such respective locations and transmitting data related thereto; and alarm means associated with at least selected of such telemetry devices for forwarding alarm signaling therefrom whenever monitored conditions thereat fall outside set parameters. Per certain of such alternatives, at least selected of such telemetry devices may monitor at least one of temperature and pressure conditions at such telemetry device, whereby an associated gas utility can adjust gas usage billing based on micro-climactic conditions.

In still other present variations, such bidirectional communications of such data collection devices may comprise wireless communications; and such network may further include meter data management means associated with such centralized data collection facility, for storing and processing data received via such network.

Those of ordinary skill in the art should appreciate from the complete disclosure herewith that the present subject matter equally relates both to apparatus and to corresponding and associated methodology. One present exemplary method relates to a method for gathering data for monitoring gas consumption and data for cathodic protection operational conditions associated with a gas pipeline of a gas utility provider. Such exemplary present method preferably comprises transmitting gas consumption data from a plurality of endpoint devices associated with respective locations of gas utility usage; monitoring for preselected cathodic protection operational conditions at selected of such gas utility usage locations, and creating data for such monitored conditions; transmitting the gas consumption data and monitored conditions data to at least one collector; and communicating such data to a head end processor via such collector and a main communications network. With such methodology, advantageously such gas consumption data and cathodic protection operational conditions data are collected and communicated to a central location for processing, to permit efficient monitoring of gas utility usage and associated gas pipeline protection conditions by a gas utility provider.

One present exemplary variation to such exemplary methodology further includes conducting data management at the central location, for storing and processing gas utility usage and pipeline protection data. In another present variation, the main communications network may comprise one of a WAN, a wireless network, and the internet. In still other variations, such method may further include monitoring for a plurality of preselected operational conditions at selected gas utility usage locations, and creating and transmitting data related thereto.

In certain of the foregoing alternative methodologies, such methods may further including forwarding an alarm signal to the central location whenever monitored conditions fall outside set parameters therefor. Still further, alternatively, the operational conditions may include at least one of temperature and pressure conditions at an associated gas utility usage location; and central location processing may include correcting gas usage billing based on micro-climactic conditions at an associated gas utility usage location.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figure, in which.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with apparatus and methodologies for carrying out cathodic protection monitoring and testing combined with meter data collection via a common device over an Advanced Metering Infrastructure (AMI).

Currently, gas utilities must monitor the condition of their cathodic protection system on a regular basis. Such monitoring is required by federal law, as well as by the utility to ensure the safety and longevity of the gas system. Due to the number of cathodic protection test stations, and the fact they are related to maintenance, rather than billing, monitoring is typically accomplished manually. Such labor intensive operation is an expense to the utility requiring extra vehicles and crews to be deployed into the utility territory. Such operations may be required at a time when the utility is trying to reduce its vehicle usage to improve its environmental impact, but not having current cathodic protection data on a regular basis can lead to re-excavation of construction sites to repair compromised systems, as well as some deterioration of the buried pipes while the system is compromised. Thus, it would be desirable to have in place a system and methodologies that may significantly reduce all costs involved with cathodic protection operation and monitoring.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Figure 1:
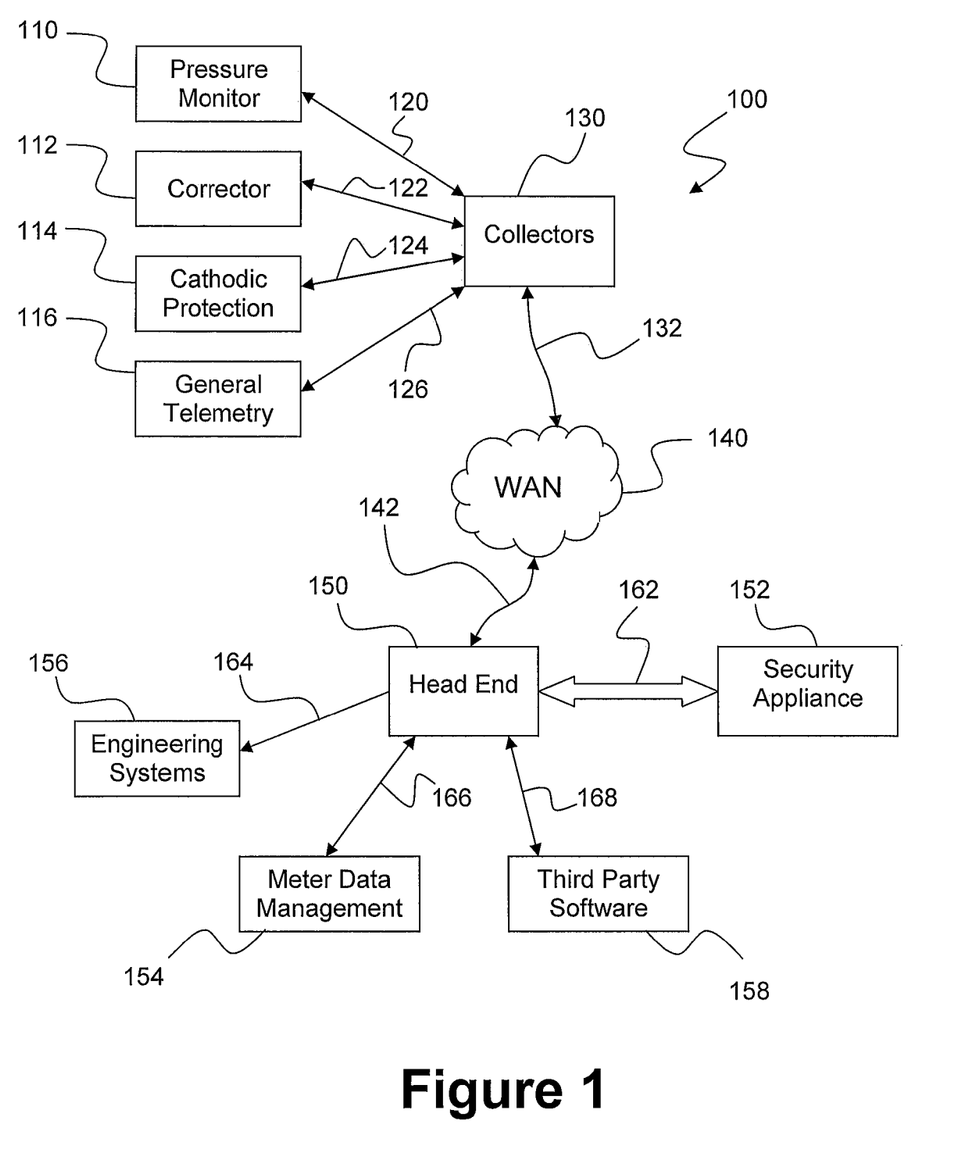
FIG. 1 is a block diagram of an exemplary telemetry system constructed in accordance with the present subject matter.

Reference is made in detail to the presently preferred embodiments of the subject cathodic protection monitoring system. Referring now to the drawings, FIG. 1 illustrates an exemplary telemetry system generally 100 in accordance with the present subject matter. System 100 may include various exemplary telemetry endpoints 110, 112, 114, and 116 located within, for example, a Gas AMI network, and which are read by network collectors 130. Telemetry endpoints may include, but are not limited to, a pressure monitor 110, a data corrector 112, cathodic protection apparatus 114, and general telemetry apparatus 116. Such exemplary telemetry endpoints 110, 112, 114, and 116 may be connected for data transmission via transmission paths 120, 122, 124, and 126, respectively, to collectors 130. Cathodic protection apparatus 114, as noted further herein after, may correspond to a stand alone device or additional functionalities combined with gas metrology and endpoint communications devices in accordance with present technology.

It should be appreciated that while transmission paths 120, 122, 124, and 126 are presently illustrated as transmission lines, such is not a specific limitation of the present technology as data may be transmitted by any suitable technology, including via wired as well as wireless technology. In similar fashion, transmission paths 162, 164, 166, and 168 (illustrated as variously coupled data between head end associated items) may also correspond to any suitable data transmission capable device or methodology, now existing or later developed. In accordance with present subject matter, the technology described herein is designed to reduce the operating costs associated with system integrity functions and the collection of consumption related information for gas utilities, and is thus not limited by the exemplary methodology and apparatus illustrated.

Those of ordinary skill in the art will appreciate that the illustration in FIG. 1 with respect to the network configuration is exemplary and that other components, for example, but not limited to, repeaters, may also be employed. It should be appreciated that while the present subject matter is described more specifically as directed to gas AMI networks, such is not a specific limitation of the disclosure as the present disclosure may be extended to water and electric networks, as applicable, particularly as to selected portions of the present disclosure, for example, such as relating to alarm notifications and data handling.

Further, while the present communications system is described as a network, other and additional communication forms including the use of mobile data collection apparatus may be employed within the scope of the present disclosure. Still further, while the present disclosure describes the use of a WAN to transmit information among selected devices, such is illustrative only as other information exchange apparatus may be used to provide other desired communications including, but not limited to, WAN's, LAN's, all varieties of wireless systems, and the Internet, and intended to include other later developed technologies.

In accordance with present exemplary disclosure, information from such exemplary endpoints 110, 112, 114, and 116 may be processed in the collectors 130 and sent over a WAN generally 140 to a head end system generally 150 by way of exemplary transmission paths 132, 142. The head end system 150 may further process the endpoint reading or data and send that information to other systems. Long-term storage can, of course, be provided by, for example, a meter data management (MDM) system generally 154, not presently illustrated in detail, and details of which form no particular aspect of the present subject matter. Such system 154 may also be considered as meter data management means associated with the head end or centralized data collection facility, for storing and processing data received via the telemetry system generally 100. With such arrangements, when incorporating the cathodic protection monitoring, advantageously usage data and gas delivery system integrity are efficiently monitored via an integrated system. For telemetry, there may be other systems that are not part of an AMR/AMI network, such as engineering systems generally 156 that monitor distribution system pressure, or software systems generally 158 provided by the manufacturer of the correctors 112 or other components monitored by the endpoints. Other systems, not presently illustrated, may also be included in system 100. Also, the representative endpoints 110, 112, 114, and 116 are intended to be understood by those of ordinary skill in the art as representing any number of such endpoints in use in a given system configuration in accordance with present subject matter, variously and respectively associated with collectors as needed.

Endpoints 110, 112, 114, and 116 "bubble-up" readings of the telemetry data periodically as needed for measurement resolution and network reliability. As described, for example, in U.S. Pat. No. 7,298,288 B2, assigned to the owner of the present technology, battery-powered endpoints have been designed to limit the power consumed in day-to-day operation. One known design feature is a bubble-up mode of operation, in which an endpoint "bubbles-up," or activates its transceiver to communicate or attempt to communicate with the AMR data collection system, according, for example, to a preset schedule. The time duration or period between bubble-up events may typically span seconds or minutes.

In accordance with present subject matter, endpoints 110, 112, 114, and 116 may also contain alarm thresholds. Per the present subject matter, when such thresholds are exceeded, the associated endpoint will initiate an alarm to relatively rapidly indicate an over/under threshold situation to the head end 150. Such alarms may take the form of special messages and may be sent at a higher frequency than normal transmissions to ensure rapid and reliable delivery. Per present subject matter, parameters stored in collectors 130 may also be changed through the use of two-way commands from the system head end 150 down to the collectors. Thought of in different terms, it is to be understood that all such various alarm features may be considered as being alarm means for forwarding alarm signaling whenever monitored conditions thereat fall outside set parameters (whether initially set or subsequently reset).

Collectors 130 validate the readings from the endpoints 110, 112, 114, and 116 and prioritize the uploading of data to the head end 150. Collectors 130 can also evaluate data from the endpoints 110, 112, 114, and 116 and generate alarms as well, per the present subject matter.

At head end 150, data is further validated, alarms may also be generated, and alarms and data are exported to an external system, all per present subject matter. Head end 150 can also accept requests from an external system (not presently illustrated) to send reconfiguration messages through the network to the endpoints 110, 112, 114, and 116, all per the present subject matter.

Figure 2:
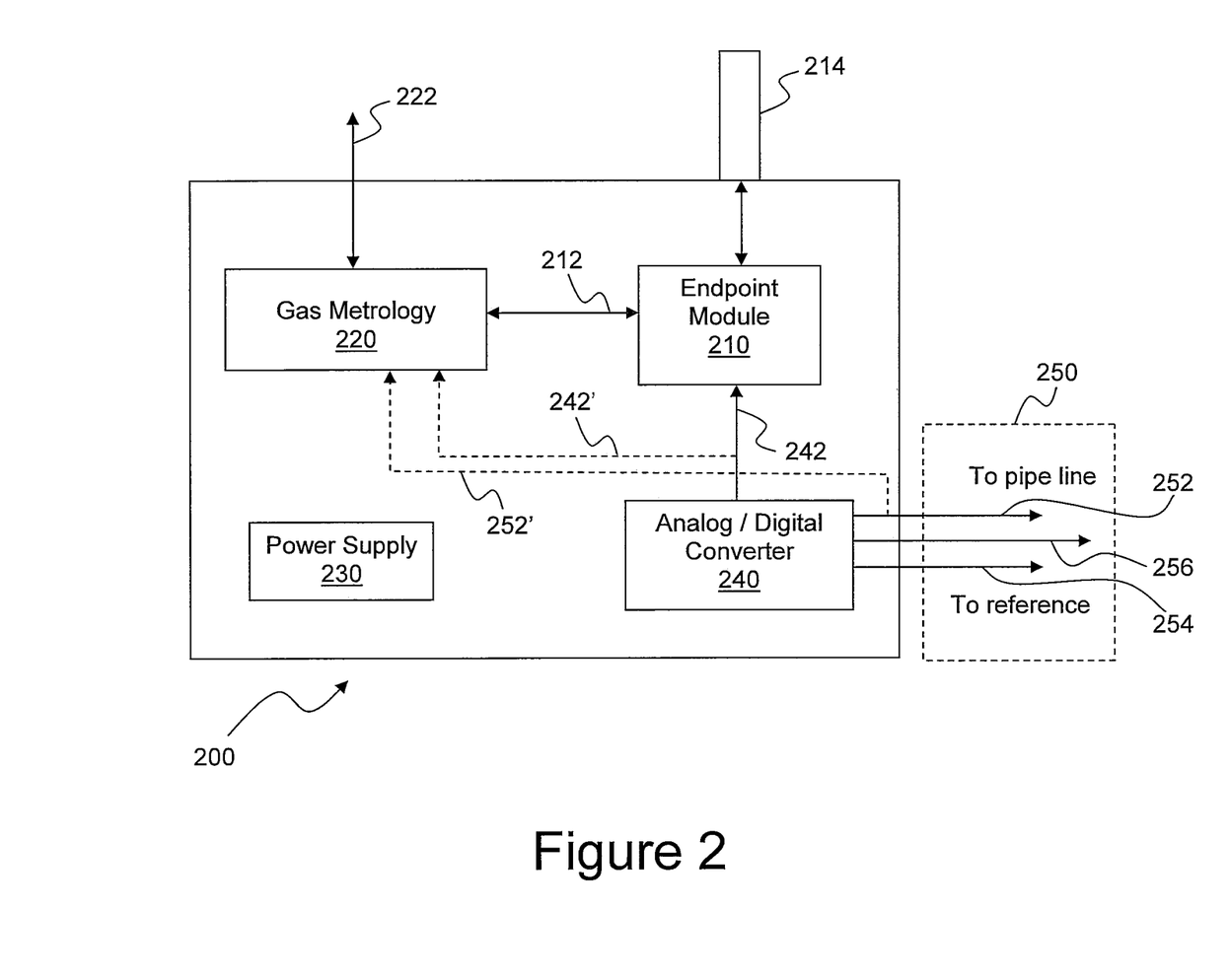
FIG. 2 is a block diagram of an exemplary gas consumption and associated endpoint device configured in accordance with present subject matter to provide cathodic protection related telemetry via a meter reading system.

With reference now to FIG. 2, there is illustrated a block diagram of an exemplary gas consumption and associated endpoint device generally 200, configured in accordance with present subject matter to provide cathodic protection related telemetry via a meter reading system. The owner of the present technology currently manufactures a line of long life battery based meter data collection systems for the gas industry. By modifying presently available devices, a device has been developed to monitor and record the state of the cathodic protection (CP) system where CP data can be retrieved by the meter reading system (either mobile or fixed network), as the meter data is collected, thus drastically reducing the cost of automated monitoring.

As seen in FIG. 2, in accordance with the present technology, a generally known endpoint module 210 previously associated with gas metrology device 220 (which together with related functionality may also be regarded as being utility metrology means) is arranged to communicate with device 220 via communications line 212. In an exemplary configuration, communications over line 212 may be preferably by a serial protocol. A power supply 230, generally housed together with gas metrology device 220 and endpoint module 210 in device 200, may provide operating power to both the gas metrology device 220 and endpoint module 210. In an exemplary configuration, power supply 230 may correspond to a battery, in particular, a long life battery. Other technologies, now known or later developed, may be practiced. It will be understood that all such variations are intended to be thought of, and encompassed by, reference as battery-operated power supply means for powering such metrology features and the various electronic devices otherwise included within device 200. Gas metrology device 220 may be coupled via line 222 to a pipe line in know fashion for data collection, details of which form no particular aspect of the present subject matter.

Endpoint module 210 may correspond to a wireless type device which is configured to communicate via exemplary representative antenna 214 with various collectors similar to collector 130 (FIG. 1) in a wireless network. It should be appreciated, however, that other forms of networks may also be provided using both or either of wired and wireless communications techniques so that in place or in addition to antenna 214, wired connection functionality may be provided for endpoint module 210.

In accordance with present technology, advantage is taken of the existing capabilities of endpoint module 210 to transmit and receive information (data) to and from head end 150 (FIG. 1) in an existing AMI or Supervisory Control and Data Acquisition (SCADA) network, such as generally illustrated in FIG. 1, to also transmit cathodic protection (CP) information. With reference to FIG. 2, such advantage is achieved by associating minimal additional components with existing endpoint 210 or metrology devices 220 to monitor an associated cathodic protection (CP) system 250 and to pass collected CP information through endpoint module 210 for transmission to head end 150.

In an exemplary configuration, the additional components may take the form of an analog to digital (A/D) converter generally 240 configured to monitor a voltage difference between a monitored pipe line (not separately illustrated) by way of input line 252 and a buried reference (not separately illustrated) used to provide a ground potential by way of reference input line 254. It should be appreciated that other measurement technologies may be employed in place of separate A/D converter 240. For example, gas metrology device 220 may be modified to directly monitor voltage on a monitored pipeline via direct connection through line 242'. Further, data from A/D converter 240 may be passed directly via line 242 to endpoint module 210 for inclusion with bubbled up data, or may first be passed to gas metrology device 220 via line 242' for inclusion in bubbled up data to be sent by endpoint module 210 to head end 150. It is intended to be understood by those of ordinary skill in the art that all such variations in converter features and related and/or associated functionality may also be thought of as being analog to digital converter means for providing cathodic protection operational condition data to either of such metrology features and such endpoint devices.

As is well understood by those of ordinary skill in the art, there are two basic types of CP systems, galvanic (non-active) systems and impressed current systems. In accordance with present technology, data may be collected from either type system by way of meter endpoint data transmission. In the instance that the utilized CP system is a galvanic system, simply monitoring the voltage difference between a protected pipe line and a reference may be sufficient. Alternatively, if CP system 250 is one configured to impress current for CP operation, parameters in addition to the pipe line-to-reference voltage monitored as described in conjunction with galvanic systems may be monitored via representative input line 256. Such additional parameters may include, without limitation, backup battery charge level for solar powered systems, and rectifier operation for alternating current (AC) powered systems.

There presently exist some stand alone automated cathodic protection monitoring systems (cellular based, etc.), but their cost and maintenance has limited their application to only a small percentage of the number of cathodic protection test points. Such systems tend to be larger transformer/rectifier injection points. In accordance with the present technology, the number of protection test points may be increased substantially while avoiding significant cost increases.

Further, the increased amount of CP data collected (for example, daily, or hourly), can help the utility to identify the type of failure (sudden/gradual), as well as the time it took place. Such data can also be used to identify failures before they occur. By relatively more rapid response, as well as scheduled planning, and by having better details as to the type of failure, a utility provider practicing the present subject matter can reduce the costs related to repairs and maintenance of cathodic protection.

While the present CP monitoring system can be combined with a meter reading endpoint, where the test point is co-located with a meter, it should be appreciated that the system can function as a standalone monitor. In either case, cathodic protection data is read by the meter data collection system. As there are typically between 10 times and 100 times as many gas meters as there are cathodic protection test stations, the overall improvement in CP monitoring capability is significant through use of the present technology.

In residential areas, a buried anode (galvanic system) is most commonly used to protect short runs of pipe. In such use, there are many small segments of pipe, and a significant number of test stations. Gas meter reading is done on a regular basis in such areas, and thus the present subject matter is most useful for such applications.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A telemetry system for transmitting data related to cathodic protection operational conditions and utility usage between user locations and a centralized data collection facility, said system comprising:
   a plurality of utility metrology means and associated endpoint devices, situated at respective locations of utility consumption, for transmitting utility consumption data associated with a respective location;
   at least one cathodic protection telemetry device respectively associated with at least one of such locations having an associated cathodic protection system device, for monitoring predetermined cathodic protection operational conditions at such telemetry device location and providing data related thereto to an endpoint device associated with such location for transmission by such endpoint device;

a main communications network;

at least one collector, for validation of said data from said endpoint devices and communications with said endpoint devices and said main communications network; and a head end processor for communications with said main communications network, such that utility consumption data and cathodic protection operational conditions data are collected from a respective location via a common endpoint device and communicated to said head end processor via said main communications network.

2. A telemetry system as in claim 1, wherein:

said utility consumption comprises gas consumption; and said system further includes a plurality of telemetry devices respectively associated with selected of said endpoint devices, for respectively monitoring for a plurality of preselected operational conditions at such endpoint device location and transmitting data related thereto.

3. A telemetry system as in claim 2, wherein said telemetry devices respectively include alarm means for forwarding alarm signaling whenever monitored conditions thereat fall outside set parameters.

4. A telemetry system as in claim 1, wherein:

said utility consumption comprises gas consumption; and said system further includes a plurality of cathodic protection telemetry devices respectively associated with a plurality of utility consumption locations, each of said telemetry devices monitoring for a preselected condition including at least one of localized associated pipeline-to-reference voltage measurements and localized impress current for an associated pipeline.

5. A telemetry system as in claim 4, wherein each of said telemetry devices respectively include analog to digital converter means for providing cathodic protection operational condition data to either of said metrology means and said endpoint devices, so that cathodic protection operational condition data is transmitted one of directly and indirectly to said head end processor via an endpoint device.

6. A telemetry system as in claim 1, wherein said telemetry device includes analog to digital converter means coupled with a localized section of an associated pipeline and an associated localized reference, for outputting digital data of pipeline-to-reference voltage measurements; and includes battery-operated power supply means for powering said metrology means and said devices.

7. A telemetry system as in claim 1, wherein:

said head end processor further includes data management functionality, for storing and processing gas usage data; and said main communications network comprises one of a WAN, a wireless network, and the internet.

8. A telemetry system as in claim 7, wherein:

said communications comprise wireless bidirectional communications; and said system further includes battery-operated power supply means for said metrology means and said devices.

9. A bidirectional gas AMI/SCADA network for transmitting data related to cathodic protection operational conditions and gas usage between user locations and a centralized data collection facility, said network comprising:

a plurality of combined gas metrology/endpoint devices for obtaining and transmitting gas usage data associated with its respective location;

a plurality of cathodic protection monitoring devices, respectively associated with selected of said metrology/endpoint device locations, for monitoring at least one preselected condition related to cathodic protection status at such selected location, and providing cathodic protection status data to the associated metrology/endpoint device for transmittal therefrom;

a WAN;

a plurality of data collection devices, for validation of said data from said metrology/endpoint devices, and for bidirectional communications with selected of said metrology/endpoint devices and said WAN; and a centralized data collection facility in bidirectional communication with said WAN, for receiving and processing gas usage data and cathodic protection status data, wherein gas usage data and cathodic protection status data for a respective location is transmitted therefrom via an associated common metrology/endpoint device.

10. A network as in claim 9, wherein said preselected condition includes at least one of localized associated pipeline-to-reference voltage measurements and localized impress current for an associated pipeline.

11. A network as in claim 9, wherein:

said cathodic protection monitoring devices include analog to digital converter means for receiving signals from associated localized cathodic protection status and for outputting in digital form said cathodic protection status data to an associated metrology/endpoint device; and said network further includes battery-operated power supply means associated with said devices.

12. A network as in claim 9, further including:

a plurality of telemetry devices respectively associated with selected of said metrology/endpoint devices, for respectively monitoring for a plurality of preselected operational conditions at such respective locations and transmitting data related thereto; and alarm means associated with at least selected of said telemetry devices for forwarding alarm signaling therefrom whenever monitored conditions thereat fall outside set parameters.

13. A network as in claim 12, wherein at least selected of said telemetry devices monitor at least one of temperature and pressure conditions at such telemetry device, whereby an associated gas utility can adjust gas usage billing based on micro-climactic conditions.

14. A network as in claim 9, wherein:

said bidirectional communications of said data collection devices comprise wireless communications; and said network further includes meter data management means associated with said centralized data collection facility, for storing and processing data received via said network.

15. A method for gathering data for monitoring gas consumption and data for cathodic protection operational conditions associated with a gas pipeline of a gas utility provider, comprising:

transmitting gas consumption data from a plurality of endpoint devices associated with respective locations of gas utility usage;

monitoring for preselected cathodic protection operational conditions at selected of such gas utility usage locations, and creating data for such monitored conditions;

transmitting the gas consumption data and monitored conditions data for a respective location to at least one collector via a common device at such respective location; and validating and communicating such data to a head end processor via such collector and a main communications network, such that gas consumption data and cathodic protection operational conditions data are collected and communicated to a central location for processing, to permit efficient monitoring of gas utility usage and associated gas pipeline protection conditions by a gas utility provider.

16. A method as in claim 15, further including conducting data management at the central location, for storing and processing gas utility usage and pipeline protection data.

17. A method as in claim 15, wherein the main communications network comprises one of a WAN, a wireless network, and the internet.

18. A method as in claim 15, further including monitoring for a plurality of preselected operational conditions at selected gas utility usage locations, and creating and transmitting data related thereto.

19. A method as in claim 18, further including forwarding an alarm signal to the central location whenever monitored conditions fall outside set parameters therefor.

20. A method as in claim 18, wherein:
the operational conditions include at least one of temperature and pressure conditions at an associated gas utility usage location; and
central location processing includes correcting gas usage billing based on micro-climactic conditions at an associated gas utility usage location.

* * * * *